May 3, 1960 H. D. CRANE 2,935,739

MULTI-APERTURE CORE STORAGE CIRCUIT

Filed June 12, 1958

INVENTOR.
HEWITT D. CRANE

BY

Christie, Parker & Hale

ATTORNEYS

United States Patent Office 2,935,739
Patented May 3, 1960

2,935,739

MULTI-APERTURE CORE STORAGE CIRCUIT

Hewitt D. Crane, Palo Alto, Calif., assignor to Burroughs Corporation, Detroit, Mich., a corporation of Michigan Application June 12, 1958, Serial No. 741,688

12 Claims. (Cl. 340—174)

This invention relates to magnetic core storage and transfer circuits, and more particularly, is concerned with a magnetic core pulse-operated circuit for storing and controlling the transfer of binary information.

In copending application Serial No. 698,633, filed November 25, 1957, in the name of Hewitt D. Crane and assigned to the assignee of the present invention, there is described a core register having a novel transfer circuit requiring no diodes or other impedance elements in the transfer loops of the magnetic core devices in the register. The present invention constitutes an improvement on the register therein described.

In the core register as described, information is transferred from one core element to another by means of pulses of predetermined current level. This level must be accurately maintained within rather close limits to insure proper operation of the register. The use of bias has heretofore been proposed, as described in copending application Serial No. 704,511, filed December 23, 1957, and in application Serial No. 706,052, filed December 30, 1957, in the name of Hewitt D. Crane and assigned to the assignee of the present invention. The bias arrangements described in these copending applications greatly extend the range between limits of the current level of the transfer pulse which can be tolerated. While these techniques provide significant improvement in the overall operation of the core register, they require that the current level of the applied transfer pulse be substantially increased, e.g., increased as much as two to one over the level required without the use of these bias techniques. Since the number of turns in a transfer loop linking pairs of cores in the core register may consist of as little as a single turn, it will be appreciated that driving current levels become quite substantial, resulting in more costly and complicated driving circuits.

The present invention provides a biasing technique for such a core register which greatly extends the allowable range of variation of the driving current level, and which at the same time provides a significant reduction in the magnitude of the driving current.

In brief, the present invention is incorporated in a register comprising at least two annular cores of magnetic material having a high flux remanence. Means including windings on the cores is provided for saturating the flux in one direction in each of the cores. Each core has a pair of small apertures, each aperture dividing the associated core into two parallel paths, an inner leg and an outer leg. The core elements are coupled by a transfer loop having windings passing through a small aperture in each of the associated core elements and linking the outer legs in the core elements formed by the apertures. Information transfer is effected by applying a current pulse of predetermined magnitude through the two windings of the transfer loop, the magnitude being just below the threshold current level required to switch flux around the annular cores.

According to the present invention, a bias winding is wound on the cores, the bias windings passing through the same apertures as the transfer loop windings but linking the inner legs formed by the respective apertures. The bias windings are connected in series with each other and in series with the transfer loops across the transfer current pulse sources. The effect of the bias winding linking the output aperture of a transmitting core element is to increase the excess M.M.F. available at the input aperture of the associated receiving core element when transferring a binary one digit.

For a more complete understanding of the invention, reference should be had to the accompanying drawings, wherein.

Figures 1, 2, 3, 4, 5, 6, 7:
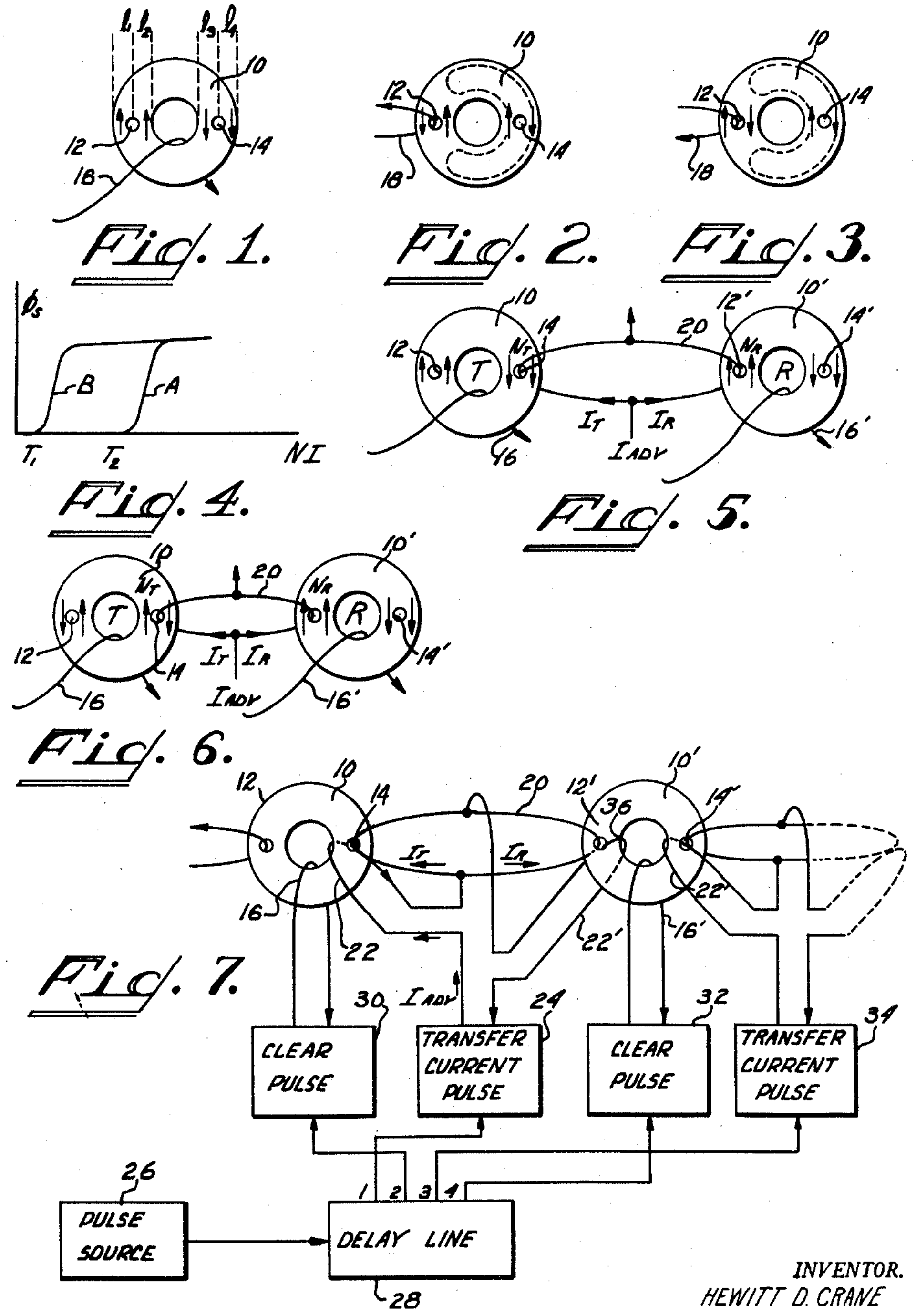
Figs. 1, 2 and 3 show a ferrite magnetic core element as used in the present invention in various conditions of magnetization.
Fig. 4 is a set of curves illustrating the magnetizing properties of the core element of Figs. 1, 2 and 3 in response to current passing through one of the small apertures in the core element.
Figs. 5 and 6 show pairs of core elements linked by a transfer circuit.
Fig. 7 shows a transfer circuit with bias added to the transmitting and receiving core elements according to the teaching of the present invention.

As described in more detail in the above-mentioned copending application, a binary register and transfer circuit can be constructed using basic core elements as shown in Figs. 1, 2 and 3. The core elements comprise an annular core 10 made of magnetic material, such as ferrite, having a "square" hysteresis loop, i.e., a material having a high flux remanence. The annular core 10 is provided with two apertures 12 and 14 which each divide the core into two legs or parallel flux paths, $l_1$, $l_2$, $l_3$, and $l_4$. If a large current is passed through the central opening of the core 10, as by a clearing winding 16, the flux in the core may be saturated in a clockwise direction, as indicated by the arrows in Fig. 1. This flux condition of the core is designated as the binary zero conditions. If a current is passed through a winding 18 linking the aperture 12, the flux in the legs $l_1$ and $l_3$ is reversed, as indicated by the arrows in Fig. 2. This flux conditoin is designated as the binary one condition.

If the current is now passed through the winding 18 in the opposite direction, the flux is switched locally in the legs $l_1$ and $l_2$ around the aperture 12, but no flux is switched in the legs $l_3$ and $l_4$ about the aperture 14, as shown by the arrows in Fig. 3.

If the core 10 is initially in its cleared or binary zero condition, applying a current through the winding 18 linking the aperture 12 of the core 10 switches flux according to the relation set forth by curve A in Fig. 4, which is a plot of switched flux $\Phi_s$ as a function of ampere-turns NI. Thus if the ampere-turns is increased up to threshold level $T_2$, substantially no flux is switched in the core. When the ampere-turns exceeds the threshold level, the flux rapidly begins to switch with further increase of ampere-turns, until a saturation level is reached in which all of the flux is switched in the opposite direction that can be switched. As mentioned above, this results in the flux pattern of Fig. 2 in which the core is in its set or binary one condition.

If the current is passed through the winding 18 in the opposite direction with the core in its binary one condition, the resulting switch in flux as a function of ampere-turns is represented by curve B of Fig. 4. It will be seen that the ampere-turns increases to a lower threshold level $T_1$ which is substantially less than the threshold level $T_2$ of curve A. The flux begins to switch until a saturation level is reached in which all the flux is switched that can be switched. The reason the threshold is at a much lower level in the latter case is that flux is switched only locally about the aperture 12 and not in the much longer flux path around the annular core.

As further described in the above-identified copending application, the flux state of one core can be transferred to another core in the following manner. Consider the circuit of Fig. 5 including a transmitter core 10 and a receiver core 10'. A coupling loop 20 links the core 10 through the aperture 14 to the core 10' through the aperture 12'. An advance current $I_{Adv}$ splits between the winding linking the aperture 14 of the transmitting core and the aperture 12' of the receiving core. The level of the advance current and the resistances in the respective windings are arranged so that, with the cores in their cleared condition as shown in Fig. 5, they are both brought up to the threshold level $T_2$, as indicated in Fig. 4. Thus no flux is switched in either core.

However, if the transmitting core 10 has been previously set with its flux in the binary one condition, as shown in Fig. 6, a current passing through the aperture 14 can switch flux locally in the core 10 because the transfer current exceeds the lower threshold level $T_1$. The switching of flux about the aperture 14 in the transmitting core 10 induces a voltage in the coupling loops which, by Lenz's law, opposes the flow of current in the branch of the coupling loop linking the aperture 14 to the transmitting core. As a result the current passing through the branch of the transfer loop 20 which links the aperture 12' of the receiving core 10' increases. The increased current provides an excess magnetomotive force or M.M.F. at the aperture 12' sufficient to switch flux in the receiving core 10', thereby setting the flux to the binary one condition.

In this manner the application of a transfer pulse of predetermined magnitude across the transfer loop 20 leaves the receiving core 10' in the binary zero state or changes it to a binary one state, depending on the existing condition of the transmitting core 10.

From the above analysis of the transfer circuit, it will be seen that as far as the transmitter core is concerned, it is desirable that the range between the lower threshold $T_1$ and the upper threshold $T_2$ be made as large as possible. The difference between the two thresholds represents an excess magnetomotive force available for switching flux in the receiver core in the transfer of a binary one. Obviously the greater this excess M.M.F., the faster the switching time of flux in the receiving core, and also the greater the range in which the advance current can vary below the upper threshold level and still produce substantial switching of flux in the receiving core.

Consider the circuit incorporating the present invention as shown in Fig. 7. The basic transfer circuit between the transmitting core 10 and the receiving core 10' is the same as described above in connection with Figs. 5 and 6. The circuit of Fig. 7, however, provides in addition a bias winding 22 which links the inner leg formed by the output aperture 14 of the transmitting core element 10. The bias winding 22 is connected in series with the transfer loop 20 across a source 24 of a constant level unidirectional current. The source 24 may be pulsed periodically by means of a clock pulse source 26 coupled to a delay line 28. The delay line 28 sequentially generates four clock pulses in response to each pulse from the source 26, the first pulse of the series in the delay line 28 actuating the transfer current pulse source 24. The remaining three pulses in the series from the delay line 28 successively actuate a clear pulse source 30 coupled to the clearing winding 16 associated with the core element 10, a clearing pulse source 32 coupled to the clearing winding 16' associated with the core element 10', and a transfer current pulse source 34 coupled to the transfer loop linking the output aperture 14' of the core element 10'.

Consider first the action of the bias winding 22 when the output aperture 14 of the transmitting core element 10 is blocked, corresponding to the condition described above in connection with Fig. 5. The ampere-turns linking the inner leg provided by the winding 22 may have a magnitude equal to or less than the threshold $T_2$. The current from a transfer pulse passing through the winding 22 is in a direction to induce flux in the same direction as the clear winding 16. The reason the ampere-turns produced by the bias winding 22 should not exceed the threshold $T_2$ is that it could otherwise result in switching of flux around the annular core element 10 when it was in the set condition with the output aperture unblocked as shown in Fig. 6.

Likewise the winding of the coupling loop 20 linking the output aperture 14 of the core element 10 provides ampere-turns equal to or below the threshold $T_2$. If it is assumed that there is a unity turns ratio between the two windings in the transfer loop 20, the two branch currents $I_T$ and $I_R$ will be equal when both core elements are in the cleared condition, and therefore the current $I_T$ will be one-half the current $I_{Adv}$ passing through the bias winding 22. Since the ampere-turns produced by both windings linking the aperture 14 are preferably equal, the optimum condition of operation is obtained with the turns in the transfer loop winding being twice the number of turns in the bias winding 22.

It will be apparent that the addition of the bias winding 22 linking the inner leg as shown in Fig. 7 has no effect on the operation of the register in transferring binary zeros.

However, consider the operation when a binary one is stored in the transmitting core element 10 so that the output aperture 14 is unblocked, corresponding to the condition described in connection with Fig. 6. If now the current pulse source 24 is pulsed, it produces double the number of ampere-turns linking the output aperture 14 and tending to switch flux locally around the aperture 14 as compared to the prior circuit arrangement described in connection with Fig. 6. This means that the excess M.M.F. available in the winding linking the input aperture 12' of the receiving core element 10' is effectively doubled by the addition of the bias winding 22. The action of the bias winding 22 is such that the direction of current flow in the winding of the transfer loop 20 linking the transmitting core element 10 is actually reversed during the time flux is switching around the aperture 14. Thus the current passing through the winding linking the aperture 12' in the receiving core element 10' can exceed the current level $I_{Adv}$ of the current pulse source 24. Thus switching time of flux in the receiving core is greatly decreased and the range over which the level of the transfer current from the source 24 may vary below the threshold level is greatly increased by the addition of the bias winding 22 linking the inner leg of the transmitting core element.

Fig. 7 shows a similar bias winding 22' linking the inner leg formed by the input aperture 12' of the receiving core element 10'. The main function of the winding 22' is to provide a symmetrical configuration to permit bidirectional operation, i.e., operation of the register with the core element 10' as the transmitting core element and the core element 10 as the receiving core element, according to the teaching in copending application Serial No. 698,615, filed November 25, 1957, in the name of David R. Bennion and assigned to the assignee of the present invention. The addition of the bias winding 22' has no effect on the operation of the core element 10' as a receiving core element.

From the above description it will be recognized that the addition of a bias winding linking the inner leg of the transmitting core element in a register increases the excess M.M.F. available for switching flux in the receiving core when a binary one is transferred. This is accomplished without increasing the level of current from the constant current source 24 which drives the transfer circuit, as compared to the operation of the register without any bias as described above in connection with Figs. 5 and 6. In fact, the center of the advance current range may be decreased because of the increase in the available excess M.M.F. at the receiving core. The lower level of advance current improves the operation for zero transfer.

What is claimed is:

1. A magnetic core device comprising a pair of annular core elements of magnetic material having high flux remanence, the core elements having a pair of small apertures in addition to the central opening formed by the annular shape of the core element, each aperture dividing the annular core element into a pair of parallel legs, means including clearing windings respectively linking the two core elements through the central openings for saturating all the flux in one direction selectively in each of the core elements, and a transfer circuit including transfer windings linking one of said legs of each of the core elements through respective ones of the apertures, the windings being connected in a closed loop current conductive path, bias windings linking the other of said legs of each of the core elements through said respective ones of the apertures linked by the closed loop windings, the bias windings being connected in series with each other and with each of the transfer windings in the closed loop with the series windings being connected to pass current in the same direction through the respective apertures, and means for pulsing a constant level unidirectional current through the series connected windings, the level of the current being below the threshold at which flux is switched in the core elements when in the cleared state produced by said flux saturating means.

2. Apparatus as defined in claim 1 wherein the transfer winding linking a particular core element through one of said apertures has twice as many turns as the bias winding linking the particular core element through the same aperture.

3. A magnetic core device comprising a pair of annular core elements of magnetic material having high flux remanence, the core elements having a pair of small apertures in addition to the central opening formed by the annular shape of the core element, each aperture dividing the annular core element into a pair of parallel legs, means including clearing windings respectively linking the two core elements through the central openings for saturating all the flux in one direction selectively in each of the core elements, and a transfer circuit including transfer windings linking one of said legs of each of the core elements through respective ones of the apertures, the windings being connected in a closed loop current conductive path, bias windings linking the other of said legs of each of the core elements through said respective ones of the apertures linked by the closed loop windings, the bias windings being connected in series with each other and with each of the transfer windings in the closed loop with the series windings being connected to pass current in the same direction through the respective apertures, and means for pulsing a current through the series connected windings.

4. A magnetic core device comprising a pair of annular core elements of magnetic material having high flux remanence, the core elements having a pair of small apertures in addition to the central opening formed by the annular shape of the core element, each aperture dividing the annular core element into a pair of parallel legs, means including clearing windings respectively linking the two core elements through the central openings for saturating all the flux in one direction selectively in each of the core elements, and a transfer circuit including transfer windings linking one of said legs of each of the core elements through respective ones of the apertures, the windings being connected in a closed loop current conductive path, bias windings linking the other of said legs of each of the core elements through said respective ones of the apertures linked by the closed loop windings, the bias windings being connected in series with each other and with each of the transfer windings in the closed loop, and means for pulsing a current through the series connected winding.

5. A magnetic core circuit comprising a transmitting core element and a receiving core element made of magnetic material having high flux retentivity, each of the core elements having a large opening defining a relatively long closed flux path around the opening and a pair of small apertures adjacent the large opening for dividing the relatively long flux path into parallel branches, the small apertures defining relatively short flux paths around the respective apertures, means for clearing all the flux around the relatively long flux path of the transmitting core element in one direction, whereby the flux extends in the same direction in the parallel branches on either side of each of the small apertures, means for clearing all the flux around the relatively long flux path of the receiving core element in one direction, whereby the flux extends in the same direction in the parallel branches on either side of each of the small apertures, a transfer circuit including a transfer winding linking the transmitting core element through one of said apertures, the winding linking only one of the two branches formed by the apertures, a transfer winding linking the receiving core element through one of said apertures, the winding linking only one of the two branches formed by the apertures, the transfer windings being connected in parallel in the transfer circuit, whereby the windings form a closed loop conductive path, a first bias winding linking the transmitting core element through said one of the apertures linked by the transfer winding, the first bias winding linking the other one of the two branches formed by the aperture, a second bias winding linking the receiving core element through said one of the apertures linked by the transfer winding, the second bias winding linking the other one of the two branches formed by the aperture, the two bias windings being connected in series with each other and with the parallel connected transfer windings, the bias winding and transfer winding associated with a given aperture being connected to conduct current in the same direction through the aperture, the transfer winding having twice as many turns as the associated bias winding, means for passing a constant level unidirectional current through the transfer circuit, the current level in the transfer and bias windings linking the transmitting core element being held below the threshold required to switch flux around the relatively long flux path but above the threshold required to switch flux around the relatively short flux path, and means for successively pulsing the means for clearing the receiving core element and the means for passing current through the transfer circuit.

6. A magnetic core circuit comprising a transmitting core element and a receiving core element made of magnetic material having high flux retentivity, each of the core elements having a large opening defining a relatively long closed flux path around the opening and a pair of small apertures adjacent the large opening for dividing the relatively long flux path into two parallel branches the small apertures defining relatively short flux paths around the respective apertures, means for clearing all the flux around the relatively long flux path of the transmitting core element in one direction, whereby the flux extends in the same direction in the parallel branches on either side of each of the small apertures, means for clearing all the flux around the relatively long flux path of the receiving core element in one direction, whereby the flux extends in the same direction in the parallel branches on either side of each of the small apertures, a transfer circuit including a transfer winding linking the transmitting core element through one of said apertures, the winding linking only one of the two branches formed by the apertures, a transfer winding linking the receiving core element through one of said apertures, the winding linking only one of the two branches formed by the apertures, the transfer windings being connected in parallel in the transfer circuit, whereby the windings form a closed loop conductive path, a first bias winding linking the transmitting core element through said one of the apertures linked by the transfer winding, the first bias winding linking the other one of the two branches formed by the aperture, a second bias winding linking the receiving core element through said one of the apertures linked by the transfer winding, the second bias winding linking the other one of the two branches formed by the aperture, the two bias windings being connected in series with each other and with the parallel connected transfer windings, the bias winding and transfer winding associated with a given aperture being connected to conduct current in the same direction through the aperture, the transfer winding having twice as many turns as the associated bias winding, and means for passing a constant level unidirectional current through the transfer circuit, the current level in the transfer and bias windings linking the transmitting core element being held below the threshold required to switch flux around the relatively long flux path but above the threshold required to switch flux around the relatively short flux path.

7. A magnetic core circuit comprising a transmitting core element and a receiving core element made of magnetic material having high flux retentivity, each of the core elements having a large opening defining a relatively long closed flux path around the opening and a pair of small apertures adjacent the large opening for dividing the relatively long flux path into two parallel branches, the small apertures defining relatively short flux paths around the respective apertures, means for clearing all the flux around the relatively long flux path of the transmitting core element in one direction, whereby the flux extends in the same direction in the parallel branches on either side of each of the small apertures, means for clearing all the flux around the relatively long flux path of the receiving core element in one direction, whereby the flux extends in the same direction in the parallel branches on either side of each of the small apertures, a transfer circuit including a transfer winding linking the transmitting core element through one of said apertures, the winding linking only one of the two branches formed by the apertures, a transfer winding linking the receiving core element through one of said apertures, the winding linking only one of the two branches formed by the apertures, the transfer windings being connected in parallel in the transfer circuit, whereby the windings form a closed loop conductive path, a first bias winding linking the transmitting core element through said one of the apertures linked by the transfer winding, the first bias winding linking the other one of the two branches formed by the aperture, a second bias winding linking the receiving core element through said one of the apertures linked by the transfer winding, the second bias winding linking the other one of the two branches formed by the aperture, the two bias windings being connected in series with each other and with the parallel connected transfer windings, the bias winding and transfer winding associated with a given aperture being connected to conduct current in the same direction through the aperture, and means for passing a constant level unidirectional current through the transfer circuit, the current level in the transfer and bias windings linking the transmitting core element being held below the threshold required to switch flux around the relatively long flux path but above the threshold required to switch flux around the relatively short flux path.

8. A magnetic core circuit comprising a transmitting core element and a receiving core element made of magnetic material having high flux retentivity, each of the core elements having a large opening defining a relatively long closed flux path around the opening and a pair of small apertures adjacent the large opening for dividing the relatively long flux path into two parallel branches, the small apertures defining relatively short flux paths around the respective apertures, means for clearing all the flux around the relatively long flux path of the transmitting core element in one direction, whereby the flux extends in the same direction in the parallel branches on either side of each of the small apertures, means for clearing all the flux around the relatively long flux path of the receiving core element in one direction, whereby the flux extends in the same direction in the parallel branches on either side of each of the small apertures, a transfer circuit including a transfer winding linking the transmitting core element through one of said apertures, the winding linking only one of the two branches formed by the apertures, a transfer winding linking the receiving core element through one of said apertures, the winding linking only one of the two branches formed by the apertures, the transfer windings being connected in parallel in the transfer circuit, whereby the windings form a closed loop conductive path, a bias winding linking the transmitting core element through said one of the apertures linked by the transfer winding, the bias winding linking the other one of the two branches formed by the aperture, the bias winding being connected in series with the parallel connected transfer windings, the bias winding and transfer winding associated with a given aperture being connected to conduct current in the same direction through the aperture, the transfer winding having twice as many turns as the associated bias winding, and means for passing a constant level unidirectional current through the transfer circuit, the current level in the transfer and bias windings linking the transmitting core element being held below the threshold required to switch flux around the relatively long flux path but above the threshold required to switch flux around the relatively short flux path.

9. A magnetic core circuit comprising a transmitting core element and a receiving core element made of magnetic material having high flux retentivity, each of the core elements having a large opening defining a relatively long closed flux path around the opening and a pair of small apertures adjacent the large opening for dividing the relatively long flux path into two parallel branches, the small apertures defining relatively short flux paths around the respective apertures, means for clearing all the flux around the relatively long flux path of the transmitting core element in one direction, whereby the flux extends in the same direction in the parallel branches on either side of each of the small apertures, means for clearing all the flux around the relatively long flux path of the receiving core element in one direction, whereby the flux extends in the same direction in the parallel branches on either side of each of the small apertures, a transfer circuit including a transfer winding linking the transmitting core element through one of said apertures, the winding linking only one of the two branches formed by the apertures, a transfer winding linking the receiving core element through one of said apertures, the winding linking only one of the two branches formed by the apertures, the transfer windings being connected in parallel in the transfer circuit, whereby the windings form a closed loop conductive path, a bias winding linking the transmitting core element through said one of the apertures linked by the transfer winding, the bias winding linking the other one of the two branches formed by the aperture, the bias winding being connected in series with the parallel connected transfer windings, the bias winding and transfer winding associated with a given aperture being connected to conduct current in the same direction through the aperture, and means for passing a constant level unidirectional current through the transfer circuit, the current level in the transfer and bias windings linking the transmitting core element being held below the threshold required to switch flux around the relatively long flux path but above the threshold required to switch flux around the relatively short flux path.

10. A magnetic core circuit comprising a transmitting core element and a receiving core element made of magnetic material having high flux retentivity, each of the core elements having a large opening defining a relatively long closed flux path around the opening and a pair of small apertures adjacent the large opening for dividing the relatively long flux path into two parallel branches, the small apertures defining relatively short flux paths around the respective apertures, means for clearing all the flux around the relatively long flux path of the transmitting core element in one direction, whereby the flux extends in the same direction in the parallel brnaches on either side of each of the small apertures, means for clearing all the flux around the relatively long flux path of the reeciving core element in one direction, whereby the flux extends in the same direction in the parallel branches on either side of each of the small apertures, a transfer circuit including a transfer winding linking the transmitting core element through one of said apertures, the winding linking only one of the two branches formed by the apertures, a transfer winding linking the receiving core element through one of said apertures, the winding linking only one of the two branches formed by the apertures, the transfer windings being connected in parallel in the transfer circuit, whereby the windings form a closed loop conductive path, a bias winding linking the transmitting core element through said one of the apertures linked by the transfer winding, the bias winding linking the other one of the two branches formed by the aperture, the bias winding being connected in series with the parallel connected transfer windings, and means for passing a constant level unidirectional current through the transfer circuit, the current level in the transfer and bias windings linking the transmitting core element being held below the threshold required to switch flux around the relatively long flux path but above the threshold required to switch flux around the relatively short flux path.

11. Apparatus for storing and transferring binary information comprising at least two annular magnetic cores, each of the cores having at least two apertures extending through the core material, a transfer loop including two windings in parallel, the windings respectively linking one aperture in each of the two cores, means for applying a transfer pulse across the two windings in parallel, the magnitude of the pulse being such as to produce a current in each of the windings that is slightly less than the threshold current level required to switch flux in the associated cores when all the flux is set in one direction around the annular cores, bias windings wound on each of the cores, the windings linking the cores through the same apertures as the transfer windings, and means for energizing the bias windings in response to said transfer pulse.

12. Apparatus for storing and transferring binary information comprising at least two annular magnetic cores, each of the cores having at least two apertures extending through the core material, a transfer loop including two windings in parallel, the windings respectively linking one aperture in each of the two cores, means for applying a transfer pulse across the two windings in parallel, the magnitude of the pulse being such as to produce a current in each of the windings that is slightly less than the threshold current level required to switch flux in the associated cores when all the flux is set in one direction around the annular cores, a bias winding wound on one of the cores and connected in series with the transfer loop, the bias winding linking the same aperture as the winding in the transfer loop linking said one of the cores, the current in the bias winding and transfer loop winding flowing in the same direction through the aperture in response to a transfer pulse.

References Cited in the file of this patent

UNITED STATES PATENTS

| | | |
|---|---|---|
| 2,802,953 | Arsenault et al. | Aug. 13, 1957 |
| 2,803,812 | Rajchman et al. | Aug. 20, 1957 |

OTHER REFERENCES

Publication: "Multihole Ferrite Core Configurations and Applications," by Abbott and Suran, published August 1957, "Proceedings of the IRE," pp. 1081–1093.